United States Patent
Nakajima et al.

(10) Patent No.: US 7,075,571 B1
(45) Date of Patent: Jul. 11, 2006

(54) DIGITAL CAMERA, AND SYSTEM FOR DETECTING FALSIFICATION OF AN IMAGE

(75) Inventors: Yasumasa Nakajima, Nagano (JP); Kazuto Mogami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 949 days.

(21) Appl. No.: 09/656,215

(22) Filed: Sep. 6, 2000

(30) Foreign Application Priority Data

Sep. 6, 1999 (JP) ............... P. 11-251660

(51) Int. Cl.
H04N 5/76 (2006.01)
H04N 9/00 (2006.01)

(52) U.S. Cl. .................. 348/231.6; 713/176
(58) Field of Classification Search ........... 382/100, 382/232; 348/231.3, 207.1
See application file for complete search history.

(56) References Cited

U.S. PATENT DOCUMENTS

| | | | | |
|---|---|---|---|---|
| 5,499,294 A | * | 3/1996 | Friedman | 713/179 |
| 5,606,609 A | * | 2/1997 | Houser et al. | 713/179 |
| 5,862,217 A | * | 1/1999 | Steinberg et al. | 713/176 |
| 5,898,779 A | * | 4/1999 | Squilla et al. | 713/176 |
| 6,005,936 A | * | 12/1999 | Shimizu et al. | 713/176 |
| 6,064,764 A | * | 5/2000 | Bhaskaran et al. | 382/183 |
| 6,216,228 B1 | * | 4/2001 | Chapman et al. | 713/176 |
| 6,889,324 B1 | * | 5/2005 | Kanai et al. | 713/176 |

FOREIGN PATENT DOCUMENTS

| | | |
|---|---|---|
| EP | 0 845 758 A2 | 6/1998 |
| EP | 0947953 A2 | 6/1999 |
| JP | 10-164549 | 6/1998 |
| JP | 11-205738 | 7/1999 |
| JP | 2000-56681 | 2/2000 |
| WO | WO 99/17537 A1 | 4/1999 |

OTHER PUBLICATIONS

Japanese Office Action SE990305 accompanied by an English translation of document Sep. 13, 2000.
Patent Abstracts of Japan 10-164549 Jun. 19, 1998.
Patent Abstracts of Japan 2000-056681 Feb. 25, 2000.
Patent Abstracts of Japan 11-205738 Jul. 30, 1999.
Japanese Abstract No. 11308564, dated Nov. 5, 1999.

* cited by examiner

*Primary Examiner*—David Ometz
*Assistant Examiner*—Luong T. Nguyen
(74) *Attorney, Agent, or Firm*—Sughrue Mion, PLLC

(57) ABSTRACT

In step S101, an electrical signal output from an CCD is converted into a digital signal. In step S103, digital data output from an analog-to-digital converter are recorded in RAM. In step S104, the data recorded on RAM are subjected to various image correction. In steps S105 through S110, the data corrected in step S104 are compressed in accordance with a JPEG compression scheme. In step S106, there is determined a location in which characteristic data are to be embedded. In step S107, characteristic data are produced from image data. In step S108, encrypted data are formed by encrypting characteristic data. In step S109, encrypted characteristic data are embedded into image data.

9 Claims, 4 Drawing Sheets

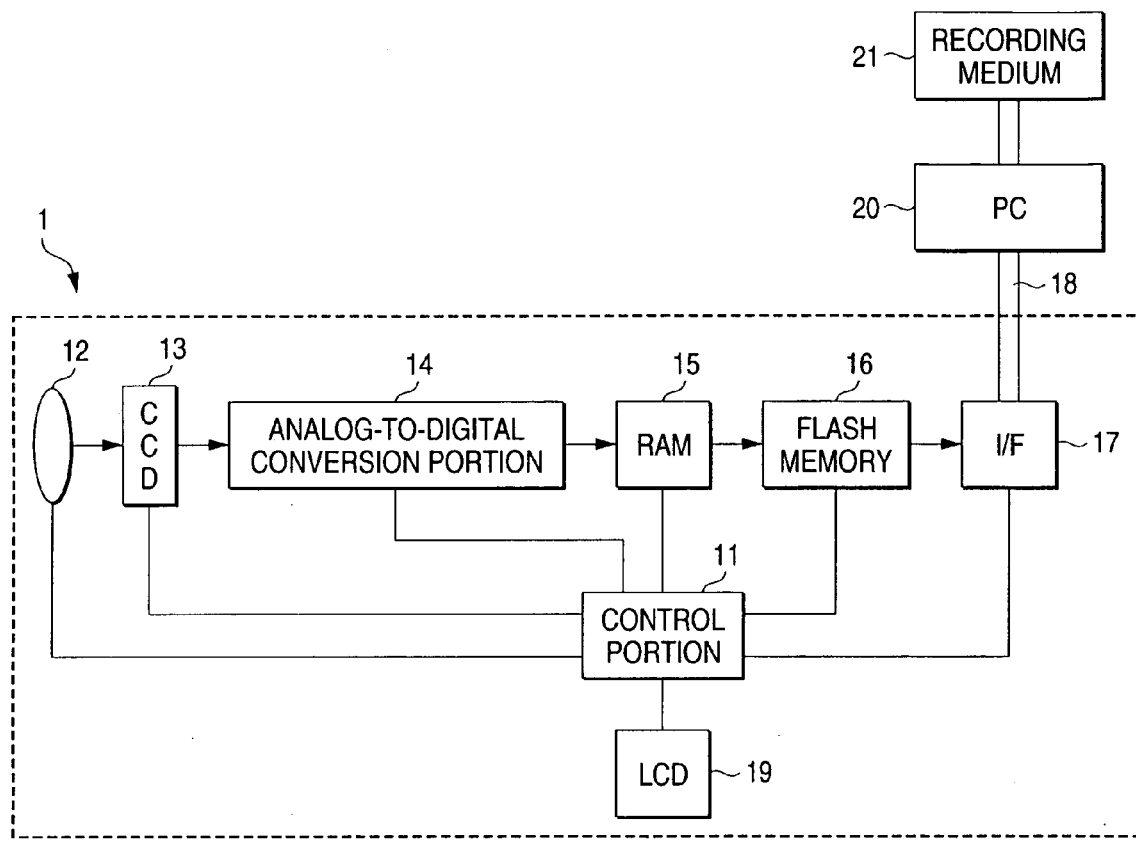

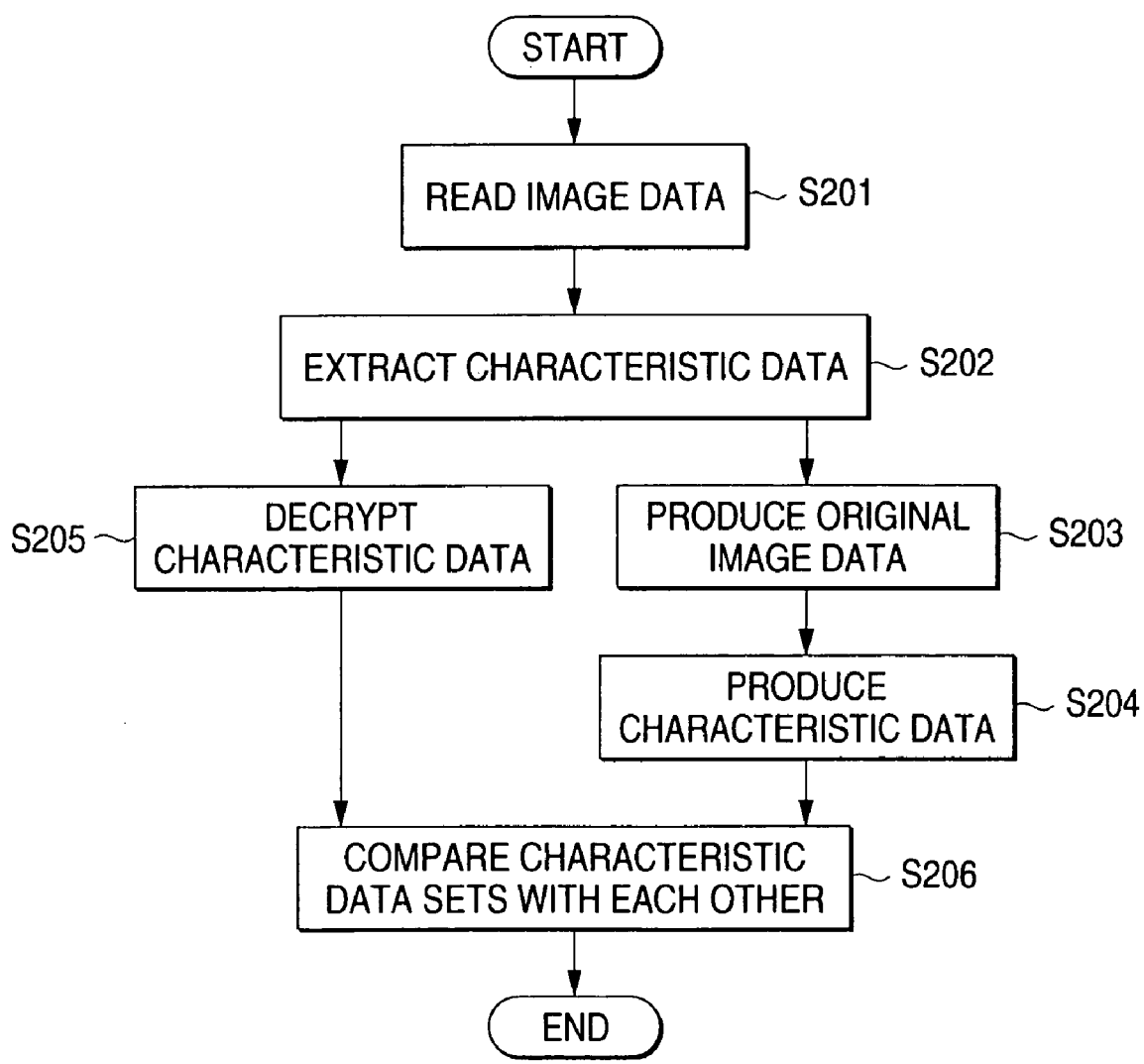

DIGITAL CAMERA, AND SYSTEM FOR DETECTING FALSIFICATION OF AN IMAGE

BACKGROUND OF THE INVENTION

1. Field of the Invention

The present invention relates to a digital camera for recording a captured image as digital data, to a method of adding a function to the digital camera, and to a system for detecting falsification of the image data recorded in the digital camera.

The present application is based on Japanese Patent Application No. Hei. 11-251660, which is incorporated herein by reference.

2. Description of the Related Art

In a conventionally-used camera, light which enters a camera at the time of a photographing operation is radiated onto a film, to thereby cause a chemical reaction and record an image on the film. The film is then developed and printed onto photographic paper. Reaction of silver chloride is commonly used as a chemical reaction for photographing. A photograph shot by such a camera is called a silver salt photograph.

Meanwhile, a digital camera is currently coming into widespread use. In the digital camera, a photosensor such as a charge-coupled device converts light into an electrical signal, and the electrical signal is further converted into a digital signal. The digital signal is recorded in a recording medium such as flash memory or the like. Use of a digital camera enables a user to personally and easily preserve or process an image in various manners through use of a processing device such as a personal computer. Further, if an image is output through use of a printer, a photograph can be printed without development of a film. In association with an improvement in print quality of a printer, it has become possible to print a high quality photograph which is hard to distinguish from a silver salt photograph.

As mentioned above, an image photographed by a digital camera can be easily processed through use of a personal computer or a like device. Further, the image photographed by a digital camera can be processed without involvement of a vestige more easily than a silver salt photograph. For this reason, in the case of photographic evidence utilized in the field of non-life insurance, if a photograph shot by a digital camera is used as important photographic evidence, the photograph may be susceptible to abuse.

SUMMARY OF THE INVENTION

Accordingly, the present invention is aimed at providing a digital camera for outputting image data for which a decision can be made as to whether or not original photographed image data have been falsified, as well as a system for detecting falsification of an image.

According to the first aspect of the present invention, there is provided a digital camera, which comprises an image pickup portion which converts light from an object to be photographed, into image data, a first producing device which produces first characteristic data from the image data, a secret key-recording portion which records a secret key to be used for encrypting data so that encrypted data can be decrypted by a public key, an encrypting device which encrypts the first characteristic data with the secret key, an embedding device which embeds encrypted first characteristic data into the image data, a recording medium which records the image data having the first characteristic data embedded therein, and a transmitting device which transmits the secret key from an external recording medium. In the event that even a bit of image data photographed by a digital camera and recorded on a recording medium is changed, no match exists between the image data and the first characteristic data, or the characteristic data are corrupted. Therefore, it is determined that the image data have been falsified after shooting. Even if a secret key is leaked to another person, image data can be safely used so long as another secret key is transmitted from an external recording medium.

According to the second aspect of the present invention, there is provided a digital camera, which comprises an image pickup portion which converts light from an object to be photographed, into image data, a first producing device which produces first characteristic data from the image data, a secret key-recording portion which records a secret key to be used for encrypting data so that encrypted data can be decrypted by a public key, an encrypting device which encrypts the first characteristic data with the secret key, an embedding device which embeds encrypted first characteristic data into the image data, and a recording medium which records the image data having the first characteristic data embedded therein, wherein the secret key is recorded in the secret key-recording portion in a form of a hidden attribute. Accordingly, details of a secret key cannot be readily read.

According to the third aspect of the present invention, there is provided a method of adding to a digital camera a function of converting light from an object to be photographed, into image data. More specifically, the method comprises the steps of (i) selecting, from among a plurality of data volumes, the volume of data pertaining to a secret key for encrypting data so that encrypted data can be decrypted by a public key, (ii) recording the secret key into a secret key-recording portion of the digital camera from an external recording medium, and (iii) loading an encryption program into the digital camera through use of the secret key. Accordingly, the grade of encryption can be selected depending on whether unsophisticated encryption or highly-reliable encryption is required.

According to the fourth aspect of the present invention, there is provided an image falsification detection system using the above-described digital camera. More specifically, the system comprises an inputting device which inputs the image data, a removing device which removes encrypted first characteristic data from the image data, a decrypting device which decrypts the encrypted first characteristic data, a second producing device which produces second characteristic data from the image data from which the encrypted first characteristic data have been removed, and a comparing device which compares the decrypted first characteristic data with the second characteristic data. If a match exists between the first characteristic data and the second characteristic data, it can be determined that input image data remain unchanged after having been shot by the digital camera.

According to the fifth aspect of the present invention, it is preferable that the above-described image falsification detection system further comprises a recording device which records a plurality of public keys corresponding to a plurality of the secret keys. Assume that a person knows the method of producing characteristic data, an encryption method, and an algorithm used for embedding characteristic data into image data, all pertaining to the present invention. Even if the person prepares an original combination of a public key and a secret key and performs the same processing operations as those described in connection with the present invention through use of a personal computer, a decision can be made as to whether or not image data may have been falsified, unless the public key attached to the image data differs from public keys which have been prepared in advance. Even if a plurality of public keys recorded in the image falsification detection system become known, there is no chance of another person knowing a secret key, because calculation of a secret key from the public key is substantially impossible.

BRIEF DESCRIPTION OF THE DRAWINGS

FIG. 2 is a block diagram showing a digital camera according to the present embodiment;

FIG. 3 is a chart for describing a method of calculating characteristic data of image data according to the present embodiment;

FIG. 5 is a flowchart showing procedures for detecting falsification of image data according to the present embodiment.

DETAILED DESCRIPTION OF THE PREFERRED EMBODIMENT

Figure 1:
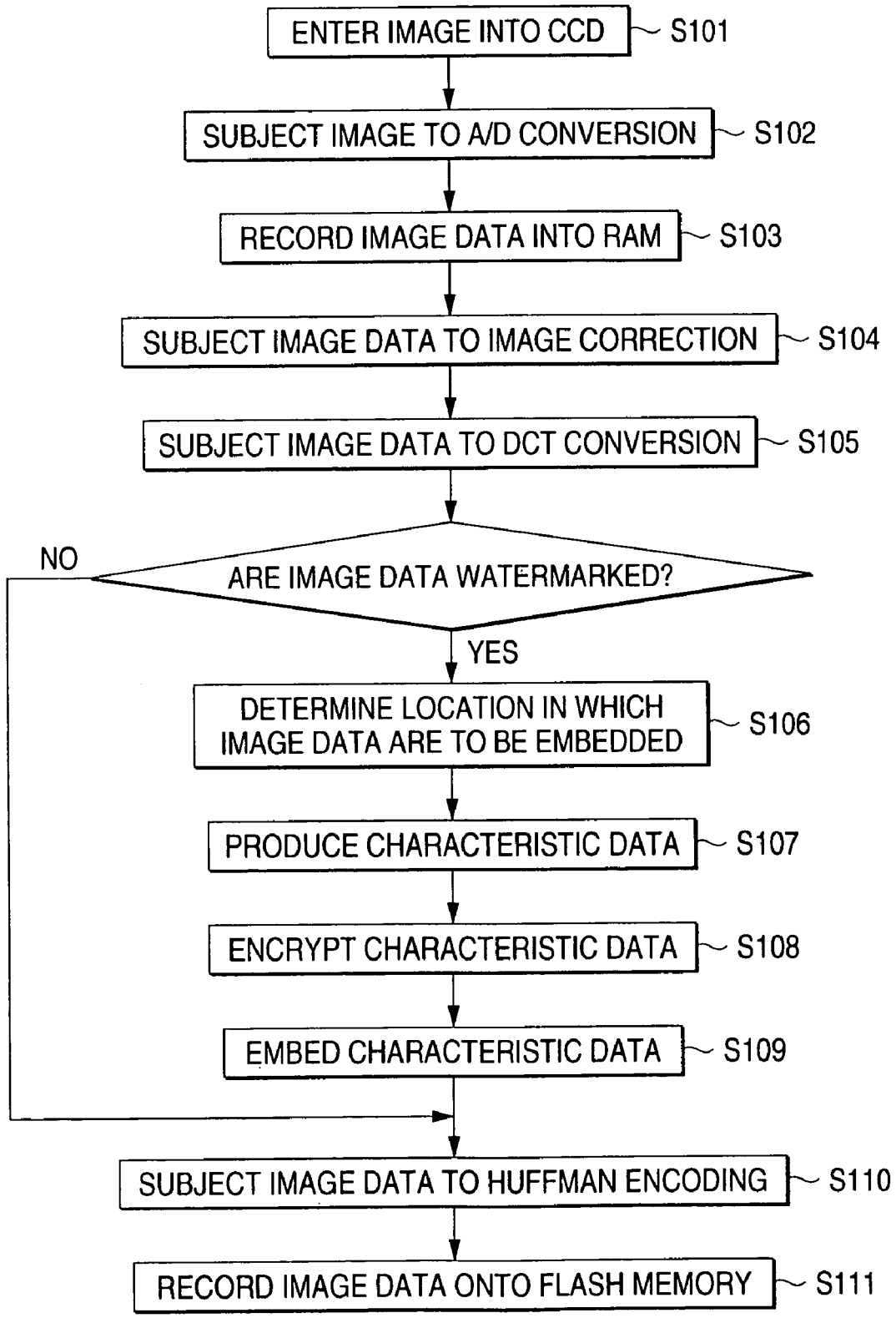
FIG. 1 is a flowchart showing procedures for recording images through use of a digital camera according to an embodiment of the present invention.

A preferred embodiment of the present invention will be described in detail hereinbelow by reference to the accompanying drawings.

FIG. 2 is a block diagram for describing a digital camera 1 according to an embodiment of the present invention. The digital camera 1 comprises a control portion 11; a condenser lens 12; a charge-coupled device (CCD) 13 acting as a photosensor; an analog-to-digital conversion portion 14; random access memory (RAM) 15; flash memory 16 acting as an image recording medium for recording image data; an interface 17 used for exchanging the data stored in the flash memory 16 with respect to an external personal computer 20; and a liquid-crystal device (LCD) 19 capable of displaying an image. The control portion 11 comprises a CPU, ROM in which are recorded programs for performing various control operations of the digital camera 1, and an input/output device. The flash memory 16 may be embodied as either built-in memory of the digital camera 1 or a memory card capable of being removably attached to the digital camera 1. Alternatively, the digital camera 1 may be equipped with both built-in memory and a removable memory card.

The user can select a mode from among an photographing mode in which a digital camera performs a photographing operation, a play mode for displaying photographed images, and a setting mode for setting the operation of the digital camera, by operating an input key provided on the digital camera 1.

In connection with the digital camera 1 according to the present embodiment, a program recorded in an external recording medium 21 (for example, a magnetic disk or CD-ROM) can be sent to the digital camera 1 from an external processing device such as a personal computer 20, by way of the interface 17, and the thus-transmitted program can be installed in the flash memory 16 of the digital camera 1. Even a program for installing a program is also recorded in the external recording medium 21 and can be installed by the personal computer 20.

The flash memory 16 and the external recording medium 21 are configured so as to store data and programs in the form of files and manage the files by reference to a file allocation table having storage locations and attributes of files registered therein. Attributes of files to be registered in the file allocation table are for causing a program to be executed so as to identify respective files. Attributes are classified into an ordinary attribute which can be identified by any program and a hidden attribute which can be identified by only a set program.

The program installed in the digital camera 1 can be executed by the control portion 11 of the digital camera 1. Alternatively, a program may be recorded on a memory card which can be removably attached to the digital camera 1, and the thus-recorded program may be transmitted to and installed in the flash memory 16 accommodated in the digital camera 1. The program may be installed by an owner himself after purchase of the digital camera 1. Alternatively, a digital camera may be sold with a program installed therein.

In the present embodiment, a program concerning procedures for embedding into image data characteristic data generated from image data in the form of digital watermarking (hereinafter referred to as a "digital watermarking program) is installed into the digital camera 1 as data for detecting falsification of an image. In a case where the digital camera 1 installed with the digital watermarking program performs a photographing operation, the digital watermarking program is executed in lieu of a program for ordinarily recording an image, and image data are recorded in the flash memory 16. In a setting mode, the user may select whether to ordinarily record photograph images or to execute a digital watermarking program.

Secret key data required for encrypting image falsification detection data are transmitted along with the digital watermarking program to the flash memory 16 accommodated in the digital camera 1 from the external recording medium 21. A plurality of programs for installing a digital watermarking program are provided. For instance, the user can select one program from three types of programs; namely, a program for installing 128 bits of secret key data, a program for installing 256 bits of secret key data, and a program for installing 512 bits of secret key data. The plurality of programs enable the user to select the grade of encryption according to whether unsophisticated encryption or highly-reliable encryption is required.

Secret key data are taken as a file of hidden attribute in the external recording medium 21 and in the flash memory 16 accommodated in the digital camera 1. Therefore, the secret key data will not be read. The secret key data can be handled more safely if secret key data is recorded in the external recording medium 21 in an encrypted form, the digital camera 1 is equipped with a decrypting device which decrypts the thus-encrypted secret key data, and the thus-decrypted secret key data are written into the flash memory 16.

In a case where the digital camera 1 is installed with a digital watermarking program, only secret key data may be loaded into the digital camera 1 from the external recording medium 21. In the event that the secret key data have found to be leaked to another person, other secret key data are transmitted to and rewritten into the flash memory 16, thereby ensuring safe use of the digital camera 1.

FIG. 1 is a flowchart showing procedures through which the digital camera 1 installed with a digital watermarking program performs a photographing operation. When the user presses a shutter of the digital camera 1, light converged by the condenser lens 12 enters the CCD 13 in step S101, wherewith the light is converted into an electrical signal.

The aperture of the condenser lens 12 and a shutter speed; that is, a storage time of the CCD 13, are controlled automatically by the control portion 11 or are controlled in accordance with an instruction from the user. A charge-coupled device, in which a plurality of pixels having a primary-colors filter of, for example, red (R), green (G), and blue (B), are arranged into a matrix, is used as the CCD 13. Use of such a CCD enables photographing of a color image. In some cases, there may be used a CCD having a complementary-colors filter of cyan (C), magenta (M), yellow (Y), and green (G).

In step S102, an electrical signal output from the CCD 13 is converted into a digital signal by the analog-to-digital conversion portion 14. In step S103, the digital data output from the analog-to-digital conversion portion 14 are recorded directly on an addressed memory location on the RAM 15 through direct memory access (DMA) for speeding up purposes and without involvement of the control portion 11.

In step S104, the data recorded in the RAM 15 are subjected to various types of image correction operations, such as white balance adjustment, interpolation, and color correction. Here, the data may be subjected to other image processing, such as scaling up or down of an image.

In steps S105 through S110, the image data corrected in step S104 are compressed in accordance with a JPEG (Joint Photographic Expert Group) scheme in order to increase the number of images that are recorded on an image recording medium, thus producing image data of smaller volume. JPEG compression of image data may be effected by the control portion 11 in accordance with software or through use of a circuit specifically designed for speeding up a compression operation.

JPEG compression procedures will now be described. In step S105, image data are divided into a plurality of blocks while 8×8 pixels are taken as a unit. For instance, image data of 640×480 pixels are divided into 4800 blocks (=80×60), and the image data are compressed on a per-block basis.

The relative relationship of density between pixels (spatial frequency) is checked for each of blocks B1 through B480. Each block is divided into a low-frequency term DCT0 to high-frequency term DCT63 by means of the Discrete Cosine Transformation (DCT). Each of terms DCT0 through DCT63 assumes a value of 8 bits. FIG. 3 shows high-frequency term DCT63 in hexadecimal notation. Each block is quantized through use of a predetermined quantization table such that most high-frequency terms assume a value of 0, to thereby increase a compression rate at the time of the image being subjected to Huffman encoding in a subsequent process.

In step S106, in order to determine a location in which characteristic data are to be embedded in a subsequent step, DCT63, which is the highest frequency component in each block, is checked in the sequence from a leading block of the DCT-converted and blocked image data. Blocks whose DCT63 assumes a value other than 0 and 1 are memorized as embedding blocks. In the example shown in FIG. 3, blocks B3, B4, B5, and B6 are selected and memorized as embedding blocks (1), (2), (3), and (4). Since 128 bits of Hash value are used in the present embodiment, 128 blocks are selected. In a case where embedding blocks are fewer in number than 128, all the remaining blocks are taken as embedding blocks at a point in time when the number of deficient blocks matches the number of blocks that have not yet been examined. The least significant bit of DCT63 of all the embedding blocks is rewritten to 0. As a result, DCT63 of, for example, block B4, is rewritten from FF to FE. Since minute variations in high frequency are hardly distinguished by the naked eye, distortion of an image is minimized.

In step S107, characteristic data are produced by the control portion 11, on the basis of the image data which have been partially rewritten in step S106. A Hash value calculated through, for example, any of various one-way Hash functions, can be used as characteristic data. In addition to a Hash value, a check sum scheme, a cyclic redundancy check scheme, or another known method capable of making a decision as to whether or not original data have been changed can be applied to the present invention. Use of such a method enables allocation of different characteristic data to each of image data sets and makes reproduction of an original image from characteristic data substantially impossible. In the present embodiment, 128 bits of Hash value are calculated as characteristic data. Here, MD (Message Digest) 5, SHA (Secure Hash Algorithm), or RIPEMD Hash function can be used.

In step S108, in order to prevent analysis of characteristic data such as a Hash value or easy rewriting of characteristic data, the control portion 11 encrypts characteristic data, to thereby produce encrypted data. An RAS (Registration, Admission, and Status) method using a public key and a secret key or another known encryption method can be used as an encryption method. The data encrypted through use of a secret key can be decrypted through use of a public key which pairs up with the secret key. The secret key is recorded in the digital camera 1 as a file of hidden attribute. The secret key cannot be leaked to another person, and in the present embodiment the user does not need to know the secret key. High difficulty is encountered in finding a secret key corresponding to a public key on the basis of the public key. Therefore, there can be prevented changing of image data into other image data from which identical characteristic data can be produced or rewriting of characteristic data in conjunction with changing of image data.

In step S109, the data whose Hash value is encrypted are written into the least significant bit of DCT63 of the selected embedding block bit by bit, whereby characteristic data are embedded into image data while deterioration of an image is minimized. Color image data of JPEG scheme have a luminance (Y) component, a U component, and a V (hue) component. In contrast, encrypted characteristic data are embedded into a Y component.

In step S110, the data having encrypted data embedded therein are subjected to Huffman encoding, wherewith the data are compressed. Huffman encoding is characterized by reversibility of data, and data are not impaired before and after Huffman encoding. A compression rate can be changed by changing the degree of quantization which is defined in a quantization table in step S105.

Figure 4:
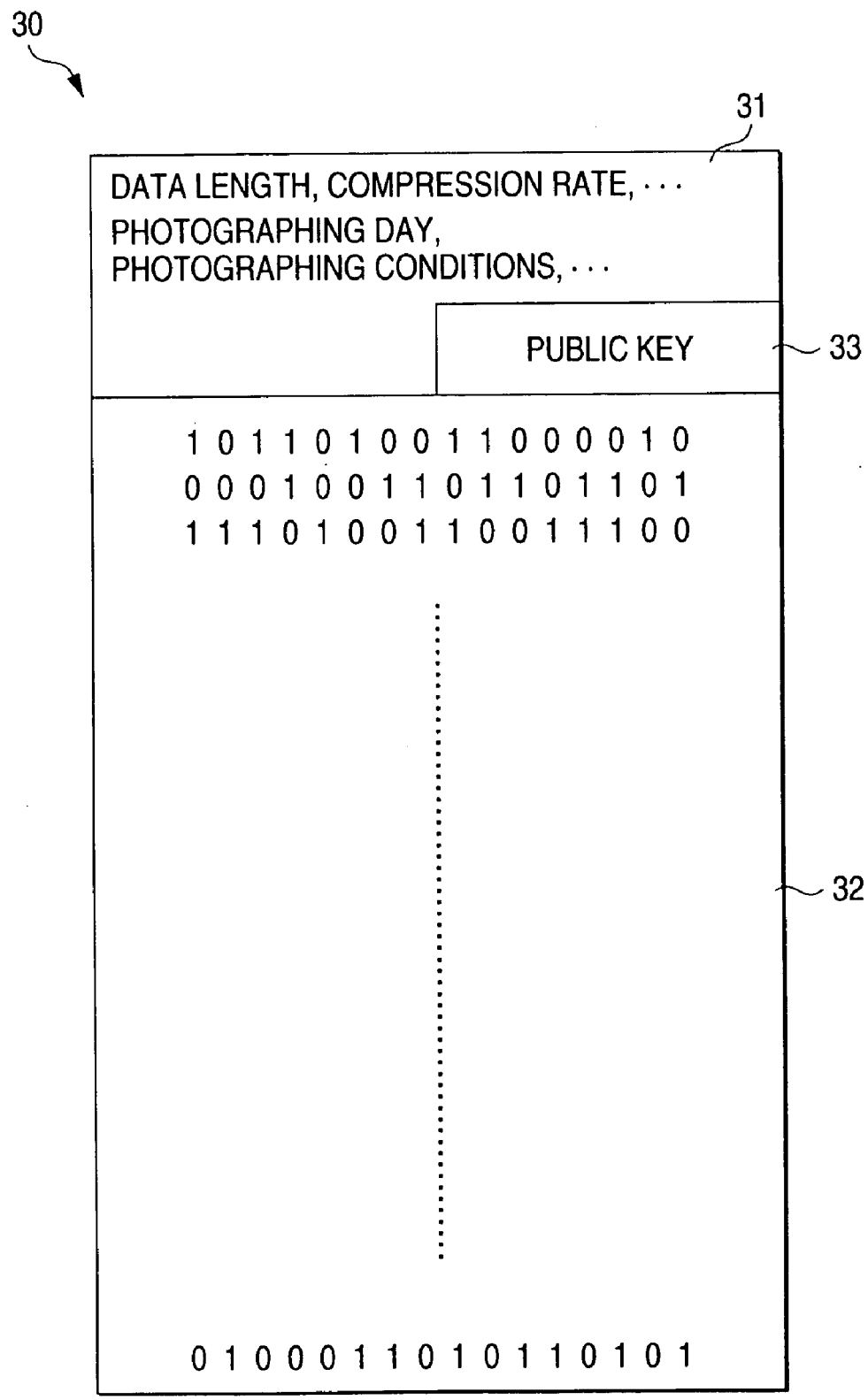
FIG. 4 is an illustration for describing the structure of a JPEG file according to the present embodiment.

In step S111, the image data compressed in step S110 are recorded as a JPEG file 30 in the flash memory 16 which acts as an image recording medium. The flash memory 16 is a rewritable recording medium which can preserve data without involvement of energization. The flash memory 16 is accommodated in the digital camera 1 or removably attached to the digital camera 1. As shown in FIG. 4, a JPEG file 30 usually comprises a header portion 31 including information in relation to a data length and a compression rate; and image data 32. In the case of a JPEG file 30 recorded by the digital camera 1, information in relation to a photographing date and photographing conditions may be recorded in the header portion 31. In the present embodiment, a public key 33 corresponding to a secret key used for encryption is further recorded in the header portion 31.

In a case where in the setting mode a digital watermarking program is set so as not to be executed, the data which have been DCT converted and quantized in step S105 are compressed in step S110 by means of Huffman encoding, through the same procedures as those employed in a common JPEG compression scheme.

In the above embodiment, characteristic data are embedded in image data during the course of a JPEG compression operation. Alternatively, after image data have been subjected to JPEG compression until Huffman encryption without embedding characteristic data into image data, image data may be partially decrypted. Characteristic data may be embedded in image data through the same procedures as those of steps S106 through S109, to thereby again subject the image data to Huffman encryption.

An image falsification detection system is formed of the digital camera 1 such as that mentioned above; a computer such as a personal computer 20 equipped with a device for receiving the image data output from the digital camera 1; and a detection program installed in the personal computer 20 for determining whether or not the image data recorded by the digital camera 1 have been changed.

By reference to a flowchart shown in FIG. 5, there will now be described steps of detecting falsification of an image through use of the image falsification detection system according to the embodiment.

In step S201, image data are loaded into the personal computer 20 from the digital camera 1 by a detection program. A loading device, which loads image data into the personal computer 20, may be embodied as a device which is connected to the interface 1 of the digital camera 1 by way of a serial cable 18 and transmits JPEG files stored in the flash memory 16 to the personal computer 20. In a case where the flash memory 16 is removable and formatted so as to be compatible with the personal computer 20, the JPEG files 30 may be loaded directly to the personal computer 20 by way of an adapter.

In step S202, image data are decrypted, and there is selected a block in which characteristic data are embedded, in the same manner as in a case where a block into which characteristic data are to be embedded is selected in step S106, and 128 bits of encrypted data are extracted.

In step S203, 0 is written into all the least significant bits of DCT63 in which encrypted data are embedded, thereby reproducing original image data before encrypted data are embedded into the image data.

In step S204, 128 bits of Hash value are calculated in the same manner as in step S107.

In step S205, the encrypted data extracted in step S202 are checked as to whether or not the data have been encrypted through use of a secret key, through use of the public key written in the header of the JPEG file. Simultaneously, the encrypted data are decrypted. As a result, a Hash value before encryption is reproduced.

In step S206, the Hash value calculated in step S204 is compared with the Hash value calculated in step S205. If a match exists between the Hash values, the image data are determined not to have been falsified after having been shot by the digital camera 1. If no match exists, it is determined that the image data may have been falsified after shooting. In step S205, in a case where the encrypted data cannot be decrypted by the public key, the image data are deemed to have not been shot by the digital camera 1 according to the present invention or to have been falsified after shooting.

In a case of the image falsification detection system according to the present embodiment of the present invention, the person who submits a photograph records on a recording medium such as a floppy disk a file (a JPEG file 30 in the present embodiment) having recorded thereon the image data, which data are output from the digital camera 1 and remain unchanged. Alternatively, the person removes the flash memory 16, which is a removable recording medium, from the digital camera 1. The person hands another person a photograph together with the image data, or either of these, at the other person's request for a photograph and image data. The person who has received the photograph and the image data loads the data from the file into the personal computer 20 and examines the data through use of a detection program installed in the personal computer 20, thereby checking whether or not the image data recorded in the file remain unchanged after having been output from the digital camera 1.

Further, so long as the detection program is provided with the function of displaying an image pertaining to image data such as the JPEG file 30, the user can identify whether or not the image is identical with that appearing in a printed photograph.

In the present embodiment, encrypted characteristic data are decrypted through use of the public key stored in the header portion 31 of the JPEG file 30. However, if the detection program stores a list including a plurality of public keys corresponding to a plurality of secret keys, encrypted characteristic data can be decrypted by selecting one public key from the list. Assume that a person knows the method of producing characteristic data, an encryption method, and an algorithm used for embedding characteristic data into image data, all pertaining to the present invention. Even when the person prepares an original combination of a public key and a secret key and performs the same processing operations as those described in connection with the present invention through use of a personal computer, a decision can be made as to whether or not image data may have been falsified, unless the public key attached to the image data is included in the list of public keys which has been prepared in advance. Even if a plurality of public keys recorded in the image falsification detection system become known, there is no chance of another person knowing a secret key, because calculation of a secret key from the public key is substantially impossible.

In the present embodiment, image data which have been JPEG compressed are recorded on an image recording medium. The present invention can also be applied to image data compressed by another compression technique or to recorded uncompressed image data. In the present embodiment, characteristic data are encrypted and embedded into image data of a JPEG file. However, characteristic data may be stored in any location of the image data; for example, in a header portion.

What is claimed is:

1. A digital camera, comprising:
    an image pickup portion which converts light from an object to be photographed, into image data;
    a producing device which produces characteristic data from the image data;
    a secret key-recording portion which records a secret key to be used for encrypting data so that encrypted data can be decrypted by a public key;
    an encrypting device which encrypts the characteristic data with the secret key;
    an embedding device which embeds encrypted characteristic data into the image data;
    a recording medium which records the image data having the characteristic data embedded therein; and a transmitting device which transmits the secret key from an external recording medium.

2. A digital camera, comprising:

an image pickup portion which converts light from an object to be photographed, into image data;

a producing device which produces characteristic data from the image data;

a secret key-recording portion which records a secret key to be used for encrypting data so that encrypted data can be decrypted by a public key;

an encrypting device which encrypts the characteristic data with the secret key;

an embedding device which embeds encrypted characteristic data into the image data; and a recording medium which records the image data having the characteristic data embedded therein, wherein the secret key is recorded in the secret key-recording portion in a form of a hidden attribute.

3. A method of adding to a digital camera a function of converting light from an object to be photographed, into image data, the method comprising the steps of:

selecting, from among a plurality of data volumes, the volume of data pertaining to a secret key for encrypting data so that encrypted data can be decrypted by a public key;

recording the secret key into a secret key-recording portion of the digital camera from an external recording medium; and loading an encryption program into the digital camera through use of the secret key.

4. The method of claim 3, wherein the secret key is recorded in a form of a hidden attribute.

5. The method of claim 3, wherein the secret key is selected in order to achieve a desired level of encryption sophistication.

6. An image falsification detection system using a digital camera which comprises an image pickup portion which converts light from an object to be photographed, into image data, a first producing device which produces first characteristic data from the image data, a secret key-recording portion which records a secret key to be used for encrypting data so that encrypted data can be decrypted by a public key, an encrypting device which encrypts the first characteristic data with the secret key, an embedding device which embeds encrypted first characteristic data into the image data, and a recording medium which records the image data having the first characteristic data embedded therein, the image falsification detection system comprising:

an inputting device which inputs the image data;

a removing device which removes the encrypted first characteristic data from the image data;

a decrypting device which decrypts the encrypted first characteristic data;

a second producing device which produces second characteristic data from the image data from which the encrypted first characteristic data have been removed; and a comparing device which compares the decrypted first characteristic data with the second characteristic data.

7. The image falsification detection system of claim 6, further comprising a recording device which records a plurality of public keys corresponding to a plurality of secret keys.

8. The image falsification detection system of claim 6, further comprising a transmitting device which transmits the secret key from an external recording medium.

9. The image falsification detection system of claim 6, wherein the secret key is recorded in the secret key-recording portion in a form of a hidden attribute.

* * * * *